United States Patent
Raghavan et al.

(10) Patent No.: US 9,683,747 B2
(45) Date of Patent: Jun. 20, 2017

(54) COMBINATION OVEN WITH CATALYTIC CONVERTER

(75) Inventors: J. K. Raghavan, Mequon, WI (US); Thomas Wayne Rand, Cedarburg, WI (US); Joshua Paul Wittig, New Berlin, WI (US); Nickolas W. Wagner, Waukesha, WI (US)

(73) Assignee: Alto-Shaam, Inc., Menomonee Falls, WI (US)

( * ) Notice: Subject to any disclaimer, the term of this patent is extended or adjusted under 35 U.S.C. 154(b) by 585 days.

(21) Appl. No.: 13/328,741

(22) Filed: Dec. 16, 2011

(65) Prior Publication Data

US 2013/0152913 A1   Jun. 20, 2013

(51) Int. Cl.
*A21B 1/08* (2006.01)
*F24C 15/20* (2006.01)
*A21B 3/04* (2006.01)
*F24C 15/32* (2006.01)

(52) U.S. Cl.
CPC ............ *F24C 15/2014* (2013.01); *A21B 3/04* (2013.01); *F24C 15/32* (2013.01); *F24C 15/327* (2013.01)

(58) Field of Classification Search
CPC .......... A21B 3/04; F24C 15/32; F24C 15/327; F24C 15/201
USPC ...................... 126/20, 21 A, 273 R; 219/401
See application file for complete search history.

(56) References Cited

U.S. PATENT DOCUMENTS

| | | | | |
|---|---|---|---|---|
| 3,364,912 A | * | 1/1968 | Dills | F24C 14/025 126/21 A |
| 3,413,444 A | * | 11/1968 | Heit | F24C 14/02 126/39 G |
| 3,451,782 A | * | 6/1969 | Jensen | A23L 3/34095 236/15 BF |
| 3,507,627 A | * | 4/1970 | Frant | B01J 19/2425 219/543 |
| 3,546,435 A | * | 12/1970 | Welch | G05D 23/24 219/501 |
| 3,549,862 A | * | 12/1970 | Holtkamp | F24C 14/02 219/412 |
| 4,292,501 A | * | 9/1981 | Maitenaz | F24C 14/02 219/391 |
| 4,302,661 A | | 11/1981 | Perry, Jr. | |
| 4,332,992 A | * | 6/1982 | Larsen | H05B 6/6435 126/21 A |

(Continued)

FOREIGN PATENT DOCUMENTS

EP       0322735 A2  *  7/1989
EP       0322735 B1     3/1992
(Continued)

OTHER PUBLICATIONS

Machine Tranlsation of EP 0322735 A2; http://translationportal.epo.org/emtp/translate/?ACTION=description-retrieval&COUNTRY=EP&ENGINE=google&FORMAT=docdb&KIND=A2&LOCALE=en_EP&NUMBER=0322735&OPS=ops.epo.org/3.1&SRCLANG=de&TRGLANG=en.*
(Continued)

*Primary Examiner* — Avinash Savani
*Assistant Examiner* — George R Blum
(74) *Attorney, Agent, or Firm* — Boyle Fredrickson, S.C.

(57) ABSTRACT

A combination oven provides for a catalyst chamber for heating and treating a bypass portion of the air circulated within the cooking chamber at a high temperature using a catalyst to process cooking fumes without substantially elevating the desired cooking temperature.

13 Claims, 2 Drawing Sheets

(56) References Cited

U.S. PATENT DOCUMENTS

| | | | | |
|---|---|---|---|---|
| 4,437,451 A | * | 3/1984 | Wysong | F23G 7/07 |
| | | | | 110/203 |
| 4,592,333 A | * | 6/1986 | Dustin | F24C 15/2014 |
| | | | | 126/21 R |
| 4,831,237 A | * | 5/1989 | Gelineau | F24C 14/02 |
| | | | | 126/21 R |
| 4,839,502 A | * | 6/1989 | Swanson | A21B 1/22 |
| | | | | 126/20 |
| 4,954,694 A | * | 9/1990 | Nagai | F24C 14/02 |
| | | | | 219/393 |
| 5,434,390 A | * | 7/1995 | McKee | A21B 1/245 |
| | | | | 126/21 A |
| 5,460,158 A | * | 10/1995 | Rigaud | F24C 15/327 |
| | | | | 126/20 |
| 5,550,352 A | * | 8/1996 | Geeroms | B29B 17/02 |
| | | | | 110/242 |
| 5,927,265 A | | 7/1999 | McKee et al. | |
| 6,060,701 A | * | 5/2000 | McKee | F24C 15/322 |
| | | | | 126/21 A |
| 6,188,045 B1 | * | 2/2001 | Hansen | F22B 27/16 |
| | | | | 126/20 |
| 6,201,222 B1 | * | 3/2001 | Baker | F24C 7/087 |
| | | | | 219/412 |
| 6,262,406 B1 | * | 7/2001 | McKee | F24C 15/322 |
| | | | | 219/681 |
| 6,318,245 B1 | | 11/2001 | Durth et al. | |
| 6,373,037 B1 | * | 4/2002 | Brown | H05B 6/6476 |
| | | | | 126/21 A |
| 6,936,794 B2 | * | 8/2005 | Zhang | A47F 3/001 |
| | | | | 219/385 |
| 7,087,864 B2 | * | 8/2006 | Oh | F24C 15/325 |
| | | | | 126/20 |
| 7,094,996 B2 | * | 8/2006 | Boehm | F24C 14/00 |
| | | | | 219/494 |
| 7,235,763 B2 | * | 6/2007 | Christiaansen | H05B 6/6485 |
| | | | | 219/460.1 |
| 7,308,852 B2 | | 12/2007 | Kaminaka et al. | |
| 7,370,647 B2 | | 5/2008 | Thorneywork | |
| 8,042,533 B2 | | 10/2011 | Dobie et al. | |
| 8,193,470 B1 | * | 6/2012 | Harlamert | F24C 14/005 |
| | | | | 126/20 |
| 8,418,684 B2 | * | 4/2013 | Robinson, Jr. | B01D 53/8687 |
| | | | | 126/19 R |
| 8,642,928 B2 | * | 2/2014 | Schulte | A21B 1/245 |
| | | | | 126/21 A |
| 2003/0116555 A1 | * | 6/2003 | Wakefield | H05B 6/6476 |
| | | | | 219/400 |
| 2004/0118392 A1 | * | 6/2004 | McFadden | A21B 1/245 |
| | | | | 126/21 A |
| 2008/0099008 A1 | * | 5/2008 | Bolton | A21B 1/245 |
| | | | | 126/21 A |
| 2009/0050129 A1 | * | 2/2009 | Robinson, Jr. | B01D 53/8687 |
| | | | | 126/19 R |
| 2011/0215091 A1 | | 9/2011 | Stanger | |

FOREIGN PATENT DOCUMENTS

| | | | |
|---|---|---|---|
| EP | 0499325 A1 | | 8/1992 |
| JP | 2003144333 A | * | 5/2003 |
| JP | 2010136773 A | * | 6/2010 |

OTHER PUBLICATIONS

China Search Report; Application No. 201210537720.2; Filing Date: Dec. 16, 2011; Applicant: Alto-Shaam, Inc.

* cited by examiner

COMBINATION OVEN WITH CATALYTIC CONVERTER

BACKGROUND OF THE INVENTION

The present invention relates to ovens for closed system operation and, in particular, an oven providing for combined convention and steam cooking and catalytic treatment of cooking fumes.

Commercial ovens, when cooking food, produce cooking fumes and odors that are typically handled by exhaust hoods providing power ventilation of fumes and odors out of the building. In some circumstances, where an exhaust hood is impractical or undesirable, it is known to treat such cooking fumes using catalytic converters which break down the components of the cooking fumes in a catalytic chemical process.

Catalytic converters for this purpose must normally operate at temperatures in excess of 500 degrees Fahrenheit. In some cases, these high temperatures may be provided by the oven heating elements themselves positioned near the catalytic unit for direct heating of the catalytic converter substrates. In such cases, and with convection ovens, the convection fan may force the same heated air used in the cooking process through the catalytic unit to clean this air of cooking fumes.

The high temperatures necessary for practical catalytic converter operation are not compatible with many low temperature cooking processes that nevertheless produce cooking fumes that need processing. In these cases, it is known to provide a chimney holding a catalytic converter and supplemental heaters to heat the catalytic converter and/or the exhaust gases to reduce the cooking fumes prior to venting the hot exhaust gases in a chimney. Chimney venting eliminates the problem of the heated gases unduly raising the internal oven temperature.

Closed-system ovens such as "combination ovens", cooking with a combination of forced air convection and steam, normally seal the cooking volume to retain heat and moisture and provide energy savings. Many foods that are preferentially made with combination ovens are cooked at temperatures below that necessary to sustain the catalytic action of the catalytic converter and yet nevertheless at temperatures that produce significant cooking fumes and odor. The use of a vent-mounted catalytic converter would defeat the desired sealed environment of the combination oven.

SUMMARY OF THE INVENTION

The present invention provides a catalytic converter system suitable for a closed system oven, such as a combination oven, that allows cooking at a temperature over the entire range of cooking temperatures, including temperatures lower than the desired catalytic conversion temperature while maintaining a sealed environment. The system provides a bypass air path that treats only a portion of the airflow within the oven cavity recycling this treated air back into the oven cavity. The small portion of air used for this bypass operation allows high temperature treatment of this portion without unduly affecting the cooking temperature of the oven. The catalyst is held in a thermally separated housing that includes a supplemental heater to bring the air up to temperature for the catalyst and that may provide some residual thermal equalization before the air is returned to the oven cavity. The thermostatic control of the oven temperature accommodates the minor amount of heating from the heated bypass air.

Specifically, the present invention provides a combination oven having an oven housing defining a cooking volume and having a door providing access to the cooking volume and sealing the cooking volume when the door is in a closed position. A convection heater assembly communicates with the cooking volume and includes a convection heater element, a steam generator, and a fan for circulating convection air and steam into and out of the cooking volume along a first path. A catalyst chamber assembly communicates with the cooking volume to conduct bypass air along a second path different from the first path through the catalyst chamber into and out of the cooking volume, the catalyst chamber including a catalytic element treating the bypass air and a bypass heater heating at least one of the bypass air and catalyst to a catalytic activation temperature.

It is thus a feature of at least one embodiment of the invention to provide catalytic conversion to reduce food cooking fumes and odor and that is suitable for use in a combination oven used for high and low temperature food processing.

The convection heater element and bypass heater element may be controlled by an electronic controller executing a stored program to permit operation of the convection heater element only, the bypass heater element only, or both the convection heater element and bypass heater element.

It is thus a feature of at least one embodiment of the invention to provide improved energy efficiencies when catalytic conversion is not required The bypass heater element may be activated automatically by the electronic controller upon selection of a preprogrammed cooking schedule by a user through a user interface that communicates with the electronic controller.

It is thus a feature of at least one embodiment of the invention to automatically invoke the catalytic conversion process when appropriate as derived from a cooking schedule.

Alternatively, the bypass heater element may be activated by the electronic controller upon manual input of a cooking parameter by a user through a user interface that communicates with the electronic controller.

It is thus a feature of at least one embodiment of the invention to permit overriding of the automatic operation by the user when catalytic operation is deemed desirable.

The catalyst chamber may provide a lower wall sloping downward toward an opening to the oven volume to drain condensation or other liquids from the catalyst chamber into the oven volume.

It is thus a feature of at least one embodiment of the invention to provide a separate catalytic chamber with the necessary thermal isolation for use with low temperature cooking in a combination oven and that can accommodate the high humidity environment of a combination oven.

The opening may also provide an outlet of bypass air.

It is thus a feature of at least one embodiment of the invention to promote drainage and cleaning of the catalyst chamber by aligning the drainage path with the airflow path so that the two flows augment each other.

The catalyst chamber may further include a standoff supporting the catalyst above the lower wall, the standoff allowing a flow of liquid along the lower wall.

It is thus a feature of at least one embodiment of the invention to prevent water accumulation within the catalyst that may affect catalyst efficacy or life.

The convection heater element and the bypass heater element may be thermally isolated from each other by a communication of heated air.

It is thus a feature of at least one embodiment of the invention to permit independent control of the catalytic conversion process necessary for low temperature cooking.

The convection heater assembly may be separated from the cooking volume by a first wall of the cooking volume and the catalyst chamber may be separated from the cooking volume by a second wall of the cooking chamber providing a different side of the cooking volume.

It is thus a feature of at least one embodiment of the invention to permit displacement of the catalyst from the heater assembly for better independent control and space utilization.

The catalyst chamber may provide a first and second opening to the cooking volume wherein the first opening is positioned in a high-pressure zone of the cooking volume during operation of the fan and the second opening is positioned in a low-pressure zone of the cooking volume during operation of the fan so that air will flow through the catalytic chamber without a fan unique to the catalytic chamber.

It is thus a feature of at least one embodiment of the invention to permit separation of the catalyst chamber from the fan without the need for a dedicated catalyst fan.

The bypass heater may be positioned upstream from the catalytic element with respect to a flow of the bypass air.

It is thus a feature of at least one embodiment of the invention to effectively provide the necessary catalytic conversion temperatures on a rapid basis.

The catalyst chamber may be separated from the oven volume by a thermally conductive metal barrier.

It is thus a feature of at least one embodiment of the invention to permit some thermal equalization between gases exiting the catalyst and the oven temperature before discharge of the heated air possibly near a food product.

The bypass heater element and catalytic element may be positioned in a first portion of the catalytic chamber representing less than half of its length between an inlet and outlet between the catalytic chamber and the cooking volume.

It is thus a feature of at least one embodiment of the invention to provide enhanced heat exchange for temperature equalization of the bypass air.

These particular features and advantages may apply to only some embodiments falling within the claims and thus do not define the scope of the invention.

DETAILED DESCRIPTION OF THE PREFERRED EMBODIMENT

Figure 1:
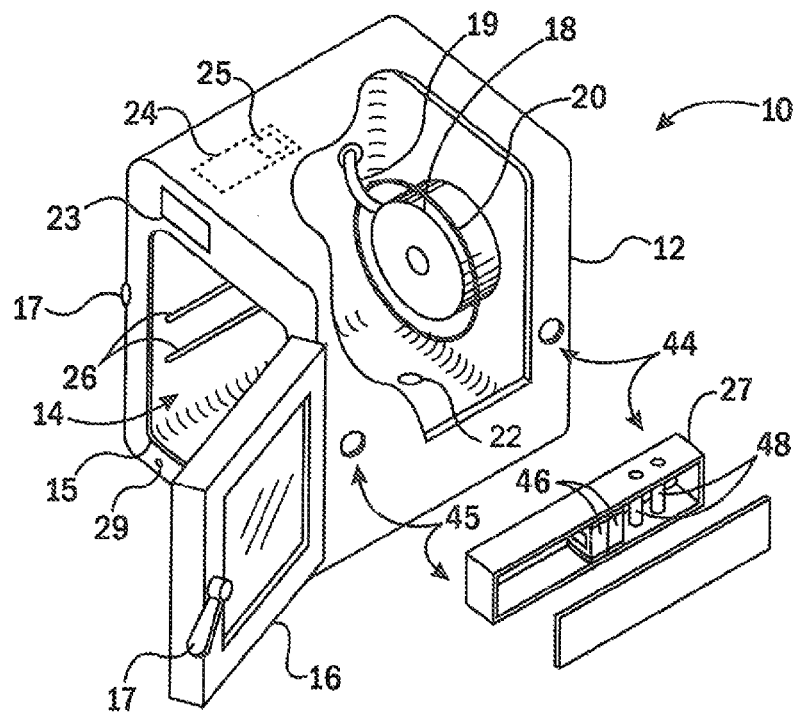
FIG. 1 is a simplified perspective view of a combination oven in partial cutaway showing the elements of the convection fan, the first heater element (e.g., a gas heat exchanger or electric heating element), a catalyst chamber holding a catalyst and heater elements, a controller board, and a control panel.

Referring now to FIG. 1, a closed-system commercial oven 10 suitable for providing steam and convection air cooking provides a housing 12 defining a cooking volume 14 open toward a front of the housing 12. The cooking volume 14 is accessible through a door 16 including a glass vision panel, the door 16 connected by a hinge at one vertical side of the cooking volume 14 to sealingly close that cooking volume 14 during cooking operations. The sealing may be promoted by a gasket 15 surrounding the opening covered by the door 16. A latch assembly 17 allows the door 16 to compress the gasket 15 and be the retained in the sealed position or to be released to allow the door 16 to open.

A door sensor 29, for example a micro switch, may provide a signal indicating whether the door 16 is open or closed and sealed by the latch assembly 17.

Figure 2:
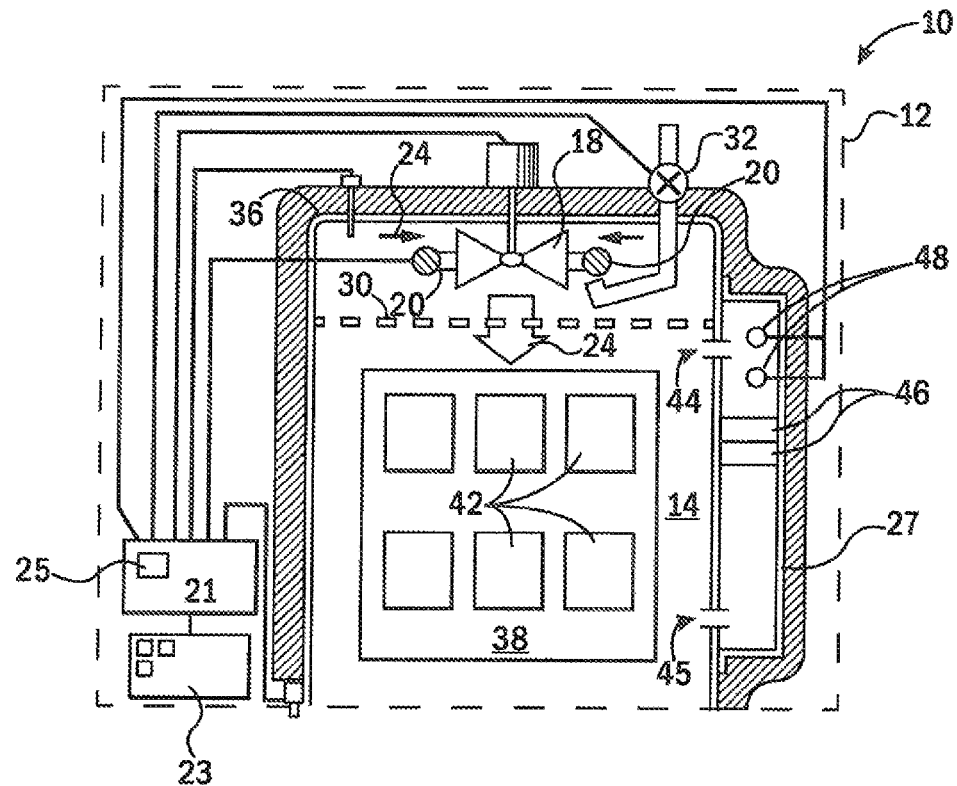
FIG. 2 is a block diagram of the combination oven of FIG. 1 showing interconnection of the controller with the various elements of the combination oven.

Referring also to FIG. 2, positioned within the housing 12 and communicating with the cooking volume 14 through a perforated panel 30 is a convection fan 18 forcing a stream of air 24 across a convection heating element 20 (shown schematically) and into the cooking volume 14 providing heat for cooking items in the cooking volume 14. The convection heating element 20 may be an electric heating element such as one or more loops of a Calrod™ type heating element or a heat exchanger receiving heat from a gas flame or the like.

The convection heating element 20 further provides heat for the production of steam produced by a water jet 19 controlled by a valve 32 typically impinging on the fan 18 and a portion of the convection heating element 20 proximate to the fan 18. Ovens of this type are commercially available from the Alto-Shaam Inc. of Menomonee Falls, Wis., and are described generally in U.S. Pat. No. 6,188,045 "Combination Oven with Three Stage Water Atomizer" hereby incorporated by reference.

One or more thermal sensors 36, for example platinum RTD or thermocouple elements, may communicate with the cooking volume 14 to provide an electrical signal indicating a temperature within that volume.

A catalyst chamber 27 positioned on the side of the cooking volume 14 may communicate with the cooking volume through an entrance aperture 44 and an exit aperture 45 passing through a wall of the cooking volume 14 and the catalyst chamber 27 which is attached to the wall of the cooking volume 14. Contained within the catalyst chamber 27 are catalyst units 46 positioned downstream from bypass heater 48 so that air flowing into the entrance aperture 44 passes past the bypass heater 48 then through the catalyst units 46 and out the exit aperture 45.

A controller circuit 21 within the housing 12 may provide an electronic computer or microcontroller receiving instructions from a control panel 23 accessible on the front of the oven 10 and having, for example, membrane switches or a touch panel with an LCD display that may be activated by a user.

As will be discussed in greater detail below, the controller circuit 21 generally provides an electronic computer executing a stored program held in a memory 25 to control the convection heating element 20, fan 18, the water jet 19, and bypass heater 48, turning them on and off as necessary to implement a particular cooking schedule that may also be stored in the memory 25. The stored program reads signals obtained from the thermal sensors 36 and the door sensor 29 as well as from the control panel 23.

The cooking volume 14 provides a central drain 22 through which collected grease and oil from a cooked product within the cooking volume 14 may pass. The drain 22 may communicate with a trap (not shown), for example a water trap, to minimize the release of cooking vapor with pressurization of the sealed cooking volume 14 caused by expansion of the air and formation of steam incident to the cooking process.

The sidewalls of the cooking volume 14 may provide for rack support rails 26 holding cooking racks 38, the latter providing open shelves arranged vertically in spaced parallel relationship. Generally, food 42 may be placed on the racks 38 to be cooked by flowing air 24 passing through the welded wire form of the racks 38.

The housing 12 may include a layer of insulation 11 surrounding cooking volume 14 as well as the fan 18 and the convection heating element 20 and the catalyst chamber 27, the latter which shares an inner wall with the outer wall of the cooking volume 14 to provide for some limited thermal conductivity through the metal panels that provide the walls of each.

Figure 3:
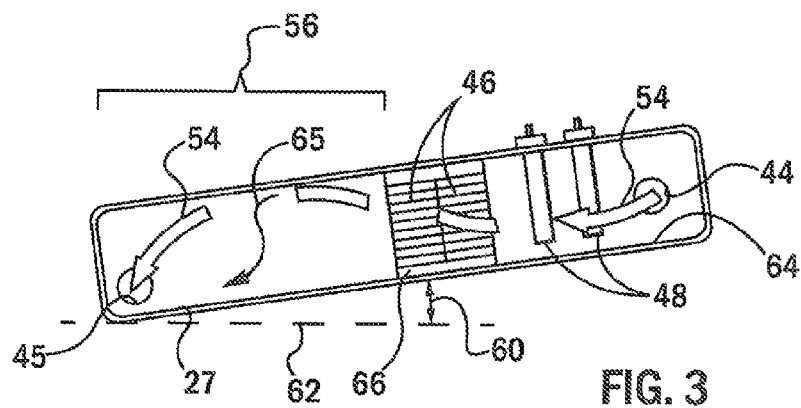
FIG. 3 is an elevational cross-section through the catalyst chamber showing its sloped orientation.
Figure 4:
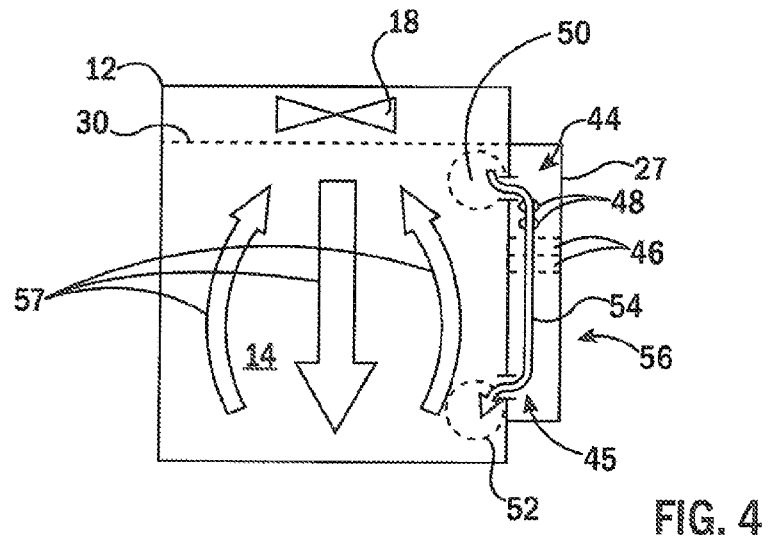
FIG. 4 is a simplified top planar cross-section of the combination oven showing relative amounts of bypass air compared to convection air within the main volume of the oven.

Referring now to FIGS. 3 and 4, an entrance aperture 44 of the catalyst chamber 27 may be positioned near an empirically determined high-pressure zone 50 within the cooking volume 14 during operation of the fan 18 during normal cooking with food 42 on the racks 38 (not shown). The exit aperture 45, in contrast, may be positioned near a relative low-pressure zone 52. This pressure difference results in bypass air 54 being drawn into the entrance aperture 44 to flow past the bypass heater 48 and through the catalyst units 46 having channels aligned with this flow. The bypass air 54 then exits through the exit aperture 45.

The bypass heater 48 may be, for example, one or more Calrod™ type heaters providing a heating to the air 54 within the catalyst chamber 27 to bring it up to the catalytic operation temperatures necessary for the catalyst units 46 (typically above 500 degrees Fahrenheit). In this regard, the bypass heaters 48 may heat both the bypass air 54 by conduction and heat the catalyst units 46 by radiation.

This heated bypass air 54 then passes through the catalyst units 46. The bypass heater 48 and catalyst units 46 are displaced within the catalyst chamber 27 to be slightly closer to the entrance aperture 44 than the exit aperture 45 to provide a downstream region 56 of the catalyst chamber 27 that may provide for some temperature equalization between the temperature inside the cooking volume 14 and the heated bypass air 54 before it is discharged at exit aperture 45. This equalization will occur between the common metal walls of the catalyst chamber 27 and the cooking volume 14. Generally, the downstream region will be greater than one half the length of the catalyst chamber 27 defined by its horizontal extent between entrance aperture 44 and exit aperture 45.

Preferably, the catalyst units 46 are a metallic substrate coated with a catalytic material known in the art. Preferred catalytic converter materials are precious metal-based materials, such as palladium or platinum/palladium-based materials such as those manufactured by Catalytic Combustion Corporation. The substrate layers are processed so that they form a series of channels generally parallel with the flow of the bypass air 54. The number of channels per unit of face area can range from 40 to 350 channels/per square inch depending upon the desired volume of bypass air 54 flowing through the catalyst chamber 27, the amount of cross sectional area of the catalyst units 46, and the amount of resistance to flow caused by the pressure differences between high-pressure zone 50 and low-pressure zone 52. The necessary flow of bypass air 54 may be empirically determined but will generally be such as to provide a treatment of only a portion of the air within the cooking volume 14 every minute. As the heated bypass air 54 passes through the catalyst units 46, cooking fumes including smoke and vapor (i.e., volatile organic compounds) in the circulating air stream are more completely oxidized to $CO_2$ and $H_2O$ to prevent smoke from being recirculated into the cooking volume 14 or exhausted therefrom when the door 16 is open or through minor exhaust passing through the drain 22. The catalytic conversion process is generally exothermic which will also provide some heating of the catalyst.

Referring to FIG. 3, a bottom wall 64 of the catalyst chamber 27 may be tipped by angle 60 with respect to a horizontal axis 62 so that condensation 65 within the catalyst chamber 27 naturally drains towards the exit aperture 45. In this regard, the exit aperture 45 may be closely flush to the bottom wall 64 so that water may drain out of the catalyst chamber 27 into the cooking volume 14. This tipping likewise tips the channels of the catalyst units 46 promoting their drainage. The catalyst units 46 may be placed on a standoff 66 spacing them from the bottom wall 64, the standoff allowing for the free flow of liquid along the bottom wall 64 between the entrance aperture 44 and the exit aperture 45. In this way, condensing steam incident to operation of the combination oven 10 and condensing within the catalyst chamber 27 upon conclusion of operation of the oven, or cleaning liquid during a cleaning operation in which cleaning liquids are used instead of water through water jet 19, may readily drain therefrom. For similar reasons, the bypass heater 48 may be mounted to the upper surface of the catalyst chamber 27 removed from the bottom wall 64 to be free from any condensing water.

Referring to FIG. 4, the bypass air 54 will typically be much smaller in flow rate than the convection air flows 57 which pass the racks 38 so that the elevated temperature of the bypass air 54 does not unduly affect the internal temperature of the cooking volume 14 as thermostatically controlled. It will be understood that this thermostatic control will compensate for some additional heating of the cooking volume 14 by the air 54. Desirably the exit aperture 45 of the catalyst chamber 27 is in a highly turbulent region of the cooking volume 14 so any excess heat in this area is rapidly dispersed throughout the oven to provide a substantially high dissipation of the heat exiting from exit aperture 45 and the elimination of hotspots. In addition, a thermally conductive wall between the catalyst chamber 27 and the cooking volume 14 allows some temperature equalization in the downstream region 56 reducing the exit temperature of the air 54.

Figure 5:
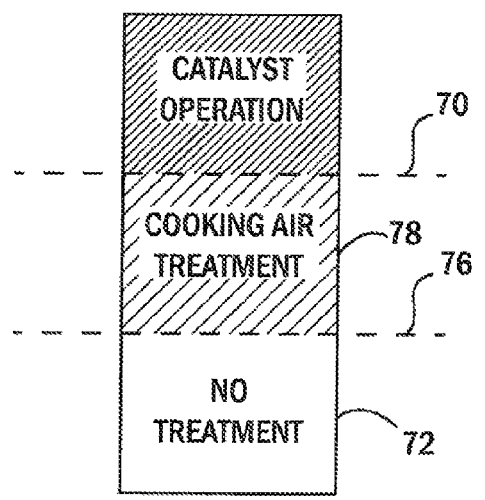
FIG. 5 is a temperature chart showing control of the heater elements of the catalyst in various cooking modes implemented by the controller of FIG. 2.

Referring now to FIGS. 1 and 5, a program in the memory 25 of the controller circuit 21 may provide for independent operation of the heater elements 20 providing control of the temperature of the cooking volume 14 and the bypass heater 48 in different cooking modes.

Normal operation of the catalyst units 46 requires a temperature of the bypass air 54 and/or the catalyst units 46 to be above the catalyst temperature 70, a temperature that may be above the operating temperature of the oven 10.

During a low temperature combination oven mode, in which the oven 10 is operated at a temperature range beneath a fume generation temperature 76 (approximately 300 degrees Fahrenheit) being a temperature at which substantial fumes are generated, the controller circuit 21 may operate the oven 10 without activation of the bypass heater 48 thus conserving energy. This operation mode, indicated by zone 72, may be automatically determined from an entered cooking schedule which provides, for example, a time-defined set of temperatures and optional application of steam tailored for cooking particular foods 42. The particular cooking schedule may be identified by data entered through the control panel 23. Alternatively, this mode may be determined by direct measurement of the thermal sensor 36. In this mode, the controller circuit 21 controls the convection heating element 20 to provide a scheduled temperature of cooking volume 14 using the thermal sensor 36 in a standard feedback control loop. An internal clock (forming part of the controller circuit 21) provides the necessary time transitions according to the cooking schedule. The application of steam by controlling valve 32 may be according to temperatures and/or time. Implementation of this cooking mode requires closure and sealing of the door 16 as determined by door sensor 29.

At a higher temperature cooking mode, also determined from the entered cooking schedule or thermal sensor 36, this cooking mode providing cooking temperatures above the fume generation temperature 76 but below the catalyst temperature 70 as indicated by zone 78, the controller circuit 21 may operate the bypass heater 48 to bring the air flowing through the catalytic catalyst chamber 27 to the catalyst temperature 70.

Extremely high temperature operations of the bypass heater 48 may not be required and the temperature of the cooking volume 14 may be used to heat the bypass air 54.

An optional thermal sensor (not shown) may be provided within the catalyst chamber 27 allowing monitoring of the temperature of the catalyst units 46 so that, in the different stages of operation, the bypass heater 48 may be controlled (for example by pulsing) to provide only the necessary makeup heat required to bring the bypass air 54 and catalyst units 46 up to the proper catalytic temperature.

Certain terminology is used herein for purposes of reference only, and thus is not intended to be limiting. For example, terms such as "upper", "lower", "above", "below", "clockwise", and "counterclockwise" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method, steps, processes, and operations described herein are not to be construed as necessarily requiring their performance in the particular order discussed or illustrated, unless specifically identified as an order of performance. It is also to be understood that additional or alternative steps may be employed.

References to a controller, computer or processor or its equivalent can be understood to include one or more computational devices including microprocessors, field programmable gate arrays, and application specific integrated circuits that can implement state aware logic and that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

We claim:

1. A combination oven comprising:
   an oven housing defining a cooking volume and having a door providing access to the cooking volume and sealing the cooking volume when the door is in a closed position;
   a convection heater assembly communicating with the cooking volume and providing a convection heater element, a steam generator, and a fan for circulating convection air and steam into and out of the cooking volume along a first path;
   a catalyst chamber assembly communicating with the cooking volume to conduct bypass air along a second path, different from the first path, wherein the second path conducts bypass air from the cooking volume into an inlet of the catalyst chamber, through the catalyst chamber, and out of an outlet of the catalyst chamber to the cooking volume, the catalyst chamber including a catalytic element treating the bypass air and a bypass heater separate from the convection heater element heating at least one of the bypass air and catalyst to a catalytic activation temperature; and
   an electronic controller executing a stored program upon selection of a preprogrammed cooking schedule for cooking a particular food at time-defined cooking temperatures by a user through a user interface that communicates with the electronic controller;
   wherein the catalyst chamber provides a floor sloping downward toward the outlet to drain condensation or other liquids from the catalyst chamber into the cooking volume; and
   wherein the electronic controller executes the stored program to:
   (i) detect a cooking temperature of the oven to produce a cooking temperature signal;
   (ii) deactivate the bypass heater element based on the cooking temperature signal when the convection heater element is on and the cooking temperature is above an ambient temperature but below a fume generation temperature providing substantial cooking fumes;
   (iii) activate the bypass heater element based on the cooking temperature signal when the convection heater element is on and the cooking temperature is above the fume generation temperature but below a catalyst activation temperature; and
   (iv) deactivate the bypass heater element based on the cooking temperature signal when the convection heater element is on and the cooking temperature is above the catalyst activation temperature.

2. The combination oven of claim 1 wherein the convection heater element and bypass heater element are controlled by an electronic controller executing a stored program to permit operation of the convection heater element only, the bypass heater element only, or both the convection heater element and bypass heater element.

3. The combination oven of claim 1 wherein the catalyst chamber further includes a standoff supporting the catalytic element above the lower wall, the standoff allowing a flow of liquid along the lower wall.

4. The combination oven of claim 1 wherein the convection heater element and the bypass heater element are thermally isolated from each other except by a communication of heated air.

5. The combination oven of claim 1 wherein the convection heater assembly is separated from the cooking volume by a first wall of the cooking volume and the catalyst chamber is separated from the cooking volume by a second wall of the cooking volume providing a different side of the cooking volume.

6. The combination oven of claim 1 wherein the inlet is positioned in a high-pressure zone of the cooking volume during operation of the fan and the outlet is positioned in a low-pressure zone of the cooking volume during operation of the fan so that air will flow through the catalytic chamber without a fan unique to the catalytic chamber.

7. The combination oven of claim 1 wherein the bypass heater is positioned upstream from the catalytic element with respect to a flow of the bypass air.

8. The combination oven of claim 1 wherein the catalyst chamber is separated from the oven volume by a thermally conductive metal barrier.

9. The combination oven of claim 6 wherein the bypass heater element and catalytic element are positioned in a first portion of the catalytic chamber representing less than half of its length between the inlet and the outlet of the catalytic chamber.

10. The combination oven of claim 1 wherein the steam generator comprises a controllable water nozzle discharging water on at least one of the fan and the convection heating element.

11. The combination oven of claim 1 wherein the fume generation temperature is approximately 300 degrees Fahrenheit.

12. A method of cooking employing an oven of a type providing:
an oven housing defining a cooking volume and having a door providing access to the cooking volume and sealing the cooking volume when the door is in a closed position;
a convection heater assembly communicating with the cooking volume and providing a convection heater element, a steam generator, and a fan for circulating convection air and steam into and out of the cooking volume along a first path;
a catalyst chamber assembly communicating with the cooking volume to conduct bypass air along a second path, different from the first path, wherein the second path conducts bypass air from the cooking volume into an inlet of the catalyst chamber, through the catalyst chamber, and out of an outlet of the catalyst chamber to the cooking volume, the catalyst chamber including a catalytic element treating the bypass air and a bypass heater separate from the convention heater element heating at least one of the bypass air and catalyst to a catalytic activation temperature wherein the catalyst chamber provides a floor sloping downward toward the outlet to drain condensation or other liquids from the catalyst chamber into the cooking volume; and
an electronic controller executing a stored program upon selection of a preprogrammed cooking schedule for cooking a particular food at time-defined cooking temperatures by a user through a user interface that communicates with the electronic controller to permit operation of the convection heater element only, the bypass heater element only, or both the convection heater element and bypass heater element, the method comprising the steps of:
(a) receiving commands from a user selecting among cooking schedules characterized as providing substantial cooking fumes or not providing substantial cooking fumes;
(b) operating the convection heater assembly to provide a desired cooking environment within the cooking volume according to the cooking schedule;
(c) operating the bypass air heater to provide heated air in the catalyst chamber only for cooking schedules characterized as providing substantial cooking fumes;
wherein the electronic controller executes the stored program to (i) detect a cooking temperature of the oven to produce a cooking temperature signal; (ii) deactivate the bypass heater element based on the cooking temperature signal when the convection heater element is on and the cooking temperature is above an ambient temperature but below a fume generation temperature providing substantial cooking fumes; (iii) activate the bypass heater element based on the cooking temperature signal when the convection heater element is on and the cooking temperature is above the fume generation temperature but below a catalyst activation temperature; and (iv) deactivate the bypass heater element based on the cooking temperature signal when the convection heater element is on and the cooking temperature is above the catalyst activation temperature.

13. An oven housing defining a cooking volume and having a door providing access to the cooking volume and sealing the cooking volume when the door is in a closed position;
a convection heater assembly communicating with the cooking volume and providing a convection heater element, a steam generator, and a fan for circulating convection air and steam into and out of the cooking volume along a first path;
a catalyst chamber assembly communicating with the cooking volume to conduct bypass air along a second path, different from the first path, wherein the second path conducts bypass air from the cooking volume into an inlet of the catalyst chamber, through the catalyst chamber, and out of an outlet of the catalyst chamber to the cooking volume, the catalyst chamber including a catalytic element treating the bypass air and a bypass heater separate from the convection heater element heating at least one of the bypass air and catalyst to a catalytic activation temperature; and
an electronic controller executing a stored program upon selection of a preprogrammed cooking schedule, for cooking a particular food during different operating modes having time-defined cooking temperatures and application of steam, by a user through a user interface that communicates with the electronic controller to operate the bypass heater;
wherein the electronic controller executes the stored program to:
(i) detect a cooking temperature of the oven to produce a cooking temperature signal;

(ii) deactivate the bypass heater element based on the cooking temperature signal when the convection heater element is on and the cooking temperature is above an ambient temperature but below a fume generation temperature providing substantial cooking fumes;
(iii) activate the bypass heater element based on the cooking temperature signal when the convection heater element is on and the cooking temperature is above the fume generation temperature but below a catalyst activation temperature; and
(iv) deactivate the bypass heater element based on the cooking temperature signal when the convection heater element is on and the cooking temperature is above the catalyst activation temperature.

\* \* \* \* \*